Sept. 2, 1930.   W. A. McCARRELL   1,774,806
TRANSMISSION GEARING
Filed Sept. 3, 1929    2 Sheets-Sheet 2
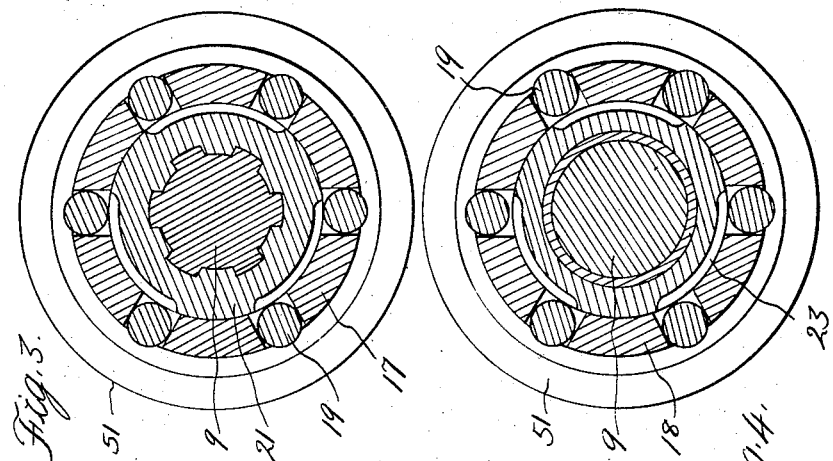
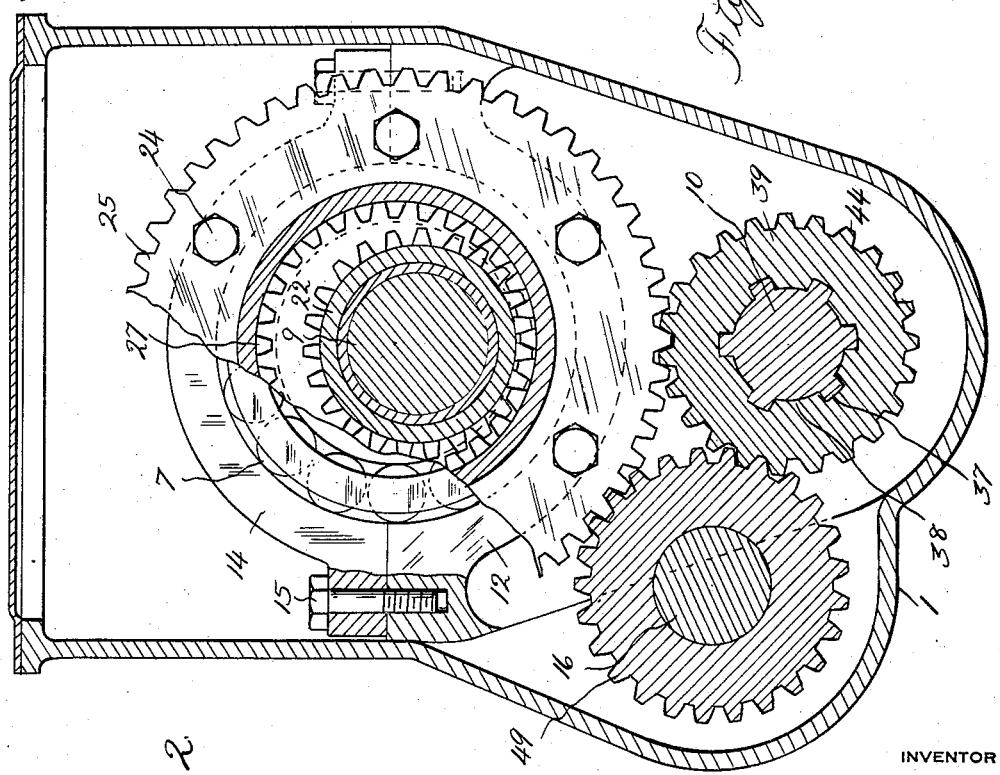
INVENTOR
William A. McCarrell
BY Whittemore Hulbert
Whittemore & Belknap
ATTORNEYS Patented Sept. 2, 1930

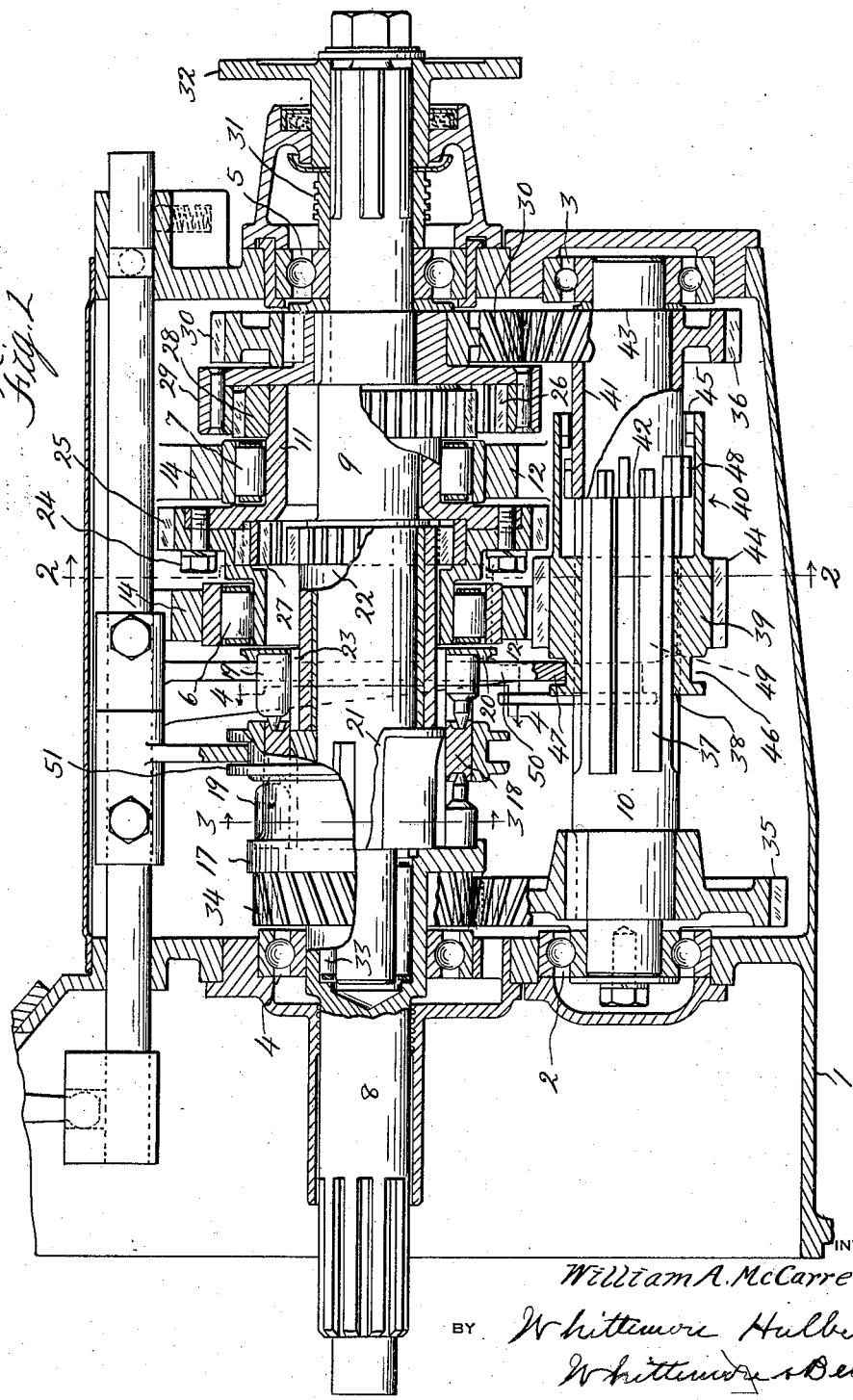

1,774,806

UNITED STATES PATENT OFFICE

WILLIAM A. McCARRELL, OF DETROIT, MICHIGAN, ASSIGNOR TO GEAR-GRINDING MACHINE COMPANY, OF DETROIT, MICHIGAN, A CORPORATION OF MICHIGAN

TRANSMISSION GEARING

Application filed September 3, 1929. Serial No. 390,131.

The invention relates to transmission gearings designed for use on motor vehicles and has for its object first the obtaining of a construction which has a plurality of quiet running differential gear speeds suitable for use as alternatives to the direct drive; second, to obtain the above described construction with a simple organization of mechanical elements that may be manufactured at relatively low cost. With these objects in view the invention consists in the novel construction, arrangement and combination of parts as hereinafter described.

In the drawings:

Figure 1 is a vertical central longitudinal section partly in elevation through my improved transmission;

Figure 2 is a cross section broken away to show parts in different planes substantially on line 2—2 of Figure 1;

Figures 3 and 4 are cross sections respectively on lines 3—3 and 4—4 of Figure 1.

As shown, 1 is the frame or case of the transmission for supporting the bearings 2, 3, 4, 5 carrying the driving shaft 8, the main shaft 9 and the countershaft 10. It also carries the internal gear spool 11 on bearings 6 and 7 which are carried upon cross supports 12 cast integral with the case. The upper part of these bearing supports 12 are made in the form of a cap 14 bolted to support by screws or studs 15. The caps 14 are bolted in place and bored integral with the supports 12, but are detachable for assembly purposes. The case 1 also carries bosses for supporting the idler gear stud 16, the shifter rods, interlocks, shifting lever, etc. The driving shaft 8 is flanged up into a drum portion 17 which have slots milled across and which carry the rolls in the roller clutches as is fully described in my previous Patents Nos. 1,380,917, 1,494,794 and 1,590,304. It also has an extension 18 which is driven from corresponding slots from jaws on drum portion of 17. This extension 18 is also provided with jaws for carrying the rolls 19 for engaging the third speed drive. At the end of the extension 18 a roll retaining plate 20 is provided, and as this extension 18 and retaining plate 20 are fastened as a unit to and driven by the jaws on the drum portion 17 of the driving shaft it is understood that it forms a solid piece or driver from stem 8 to retaining plate 20 and carries the rolls 19 for driving the third and direct speeds.

The main shaft 9 is splined at its front end and carries a dog or main shaft driver portion 21, made as a loose piece for assembly purposes. This driver or dog is provided with recesses or splines on its outer periphery for receiving the driving rolls 19 or other form of clutch that may be used. The main shaft 9 carries the internal gear driver 22 which is a free running fit upon main shaft 9. The driver 22 is provided with recesses 23 on its hub portion for engagement with the rolls 19 for driving third speed.

The internal gear spool 11 which is carried on bearings 6 and 7 is made in two pieces, doweled and bolted together by means of the screws 24. This spool has the external gear 25, a part of or mounted on the outside of spool which allows the shortening of the case by means of lower speed drives through the rear internal gear 26. The internal gear 27 is made as a separate piece from spool 11 to allow for grinding the teeth, or other finish after hardening, and is afterward pressed in and keyed in place to become an integral part of the spool 11. The rear internal gear driver 28 is made as a separate gear and keyed and pressed on the spool after bearing 7 is in place, thus allowing the use of a smaller bearing. The main shaft 9 carries the driven member 29 in which the internal gear 26 is placed. This internal gear is made as a separate piece so that the teeth may be ground or otherwise finished after hardening.

Mounted on the hub of this main shaft drive 29 is the spiral gear 30 which is the driven member for second speed, and the whole unit comprised of driven members 26, 29 and 30 is keyed to the main shaft 9 to drive same. This method of mounting gear 30 on part 29 allows shorter construction.

The part 31 is the usual speedometer drive gear while the part 32 is any standard universal flange. The main shaft 9 is journaled into drive shaft 8, and is supported on its front end by means of bearing 33 thus providing for the independent rotation of each member. Keyed to driver 8 is the spiral gear 34 which engages with countershaft drive gear 35 for driving countershaft 10. The countershaft driving gear is made of such a helical angle that the thrust is carried against bearing 4, therefore the thrust on countershaft driven gear 35 must be in the opposite direction. As the tooth angle on second speed gear 30 is made to carry the thrust against bearing 5, therefore the thrust on countershaft second speed gear 36 must be in the opposite direction so that the thrusts of the countershaft gears 35 and 36 oppose each other for balance, and any excess thrust is carried on bearings 2 and 3. The gear 35 is made as a separate piece and is keyed to countershaft 10. Countershaft 10 is provided with splines 37 through part of its length to engage with internal splines 38 in combination first speed driver gear 39, and clutch portion 40 to drive same. It is also provided with cylindrical portion 41 upon which the second speed gear 36 is guided between shoulders 42 and 43, and upon which it is free to rotate when not in engagement for driving.

The combination first, reverse and second speed driver is provided with teeth 44 staggered clutch teeth 45 and groove 46 for engagement with shifter fork 47. The free running countershaft gear 36 has staggered external clutch teeth 48 provided on its hub for driving engagement with combination gear and clutch member 39. The reverse idler gear 49 is free to rotate on the idler shaft 16 and is also slidable back and forward on said shaft 16 by means of a reverse shifter fork operating in groove 50. This gear is in constant engagement with combination gear 39, and free to rotate with same as well as slidable back and forth for engagement with teeth on spool 11 and combination gear 39.

The transmission may be provided with any suitable shifter mechanism including a plurality of shifter rods or slides to which the several shifter rods are connected. However, as this mechanism forms no part of the present invention, specific description of the same is omitted.

With the construction as above described the operation is as follows: Whenever the driving shaft 8 is running the countershaft 10 will also be driven through the medium of the constant mesh spiral gear train 34 and 35. The gear wheel 39 on the counter shaft 10 and the reverse idler gear 49 will also be driven but in the position of parts shown in Figure 1 neither of these gears are in mesh with the driven train. Therefore the main or driven shaft 9 remains stationary.

To establish first or emergency forward drive the gear wheel 39 is shifted by the operation of the fork 47 so as to be meshed with the gear wheel 25 which will thus communicate motion to this gear wheel and through the gear wheel 28 and internal gear wheel 26 will communicate low speed forward motion to the main shaft 9. To establish reverse the gear wheel 29 is shifted into the position shown in Figure 1 and the idler gear 49 is shifted by the fork operating in the groove 50 so as to mesh the same with the gear wheel 25 while still retaining the intermeshing engagement with the gear wheel 39. This will drive the main shaft 9 at the same speed but in reverse direction. To establish second speed forward the gear wheel 39 with its clutch portion 40 is shifted in the reverse direction from that before described which causes the clutch teeth 45 to engage with the clutch teeth 48 on the cylindrical portion 41 of the gear 36. This will rotatively couple the countershaft 10 to the gear wheel 36 which through the constant mesh spiral gear trains 36 and 30 will drive the shaft 9. As these constant mesh gear trains 34, 35, 36 and 30 are spiral or helical gears, they will be quiet running if the speed of operation is not greater than to produce a vehicle speed of twenty-five miles per hour.

To establish third speed forward the gear wheel 39 is returned to the position shown in Figure 1 and the drive shaft 8 is clutched to the internal gear driver 22. This is accomplished by the sliding of a collar 51 sleeved on the drum 17 to the right as shown in Figure 1 which depresses the rolls 19 into the recesses 23 on the hub of the driver 22 and thereby directly couples the shaft 8 to the driver. As the external gear on the driver 22 is in constant mesh with the internal gear 27 on the spool 11, this spool will be driven and through the medium of the gear wheel 28 and internal gear wheel 26 will drive the shaft 9. This third speed forward may be used for driving the vehicle at any desired speed and will be quiet in its operation. Finally, to establish direct drive the collar 51 is moved upon the drum 17 in the reverse direction so as to depress the rollers 19 into the splines of the dog or main shaft driver 21 thereby coupling the shafts 8 and 9.

What I claim as my invention is:

1. In a transmission gearing, the combination of axially aligned drive and driven shafts having a journaled engagement with each other, a peripheral clutch member on said driven shaft adjacent to said drive shaft, a member rotatively mounted on said driven shaft having a peripheral clutch portion adjacent to the clutch portion on said driven shaft, an internal gear reduction train between said rotatively mounted member and said driven shaft, a sleeve on said drive shaft surrounding the peripheral clutch portion of said driven shaft and said rotatively mounted member, roller clutches carried by said sleeve member for respectively engaging said peripheral clutch members and a shiftable member for alternatively engaging said roller clutches to effect a clutching between said drive shaft directly to said driven shaft or indirectly through the medium of said rotatively mounted member and internal gear train.

2. In a transmission gearing, the combination with a drive shaft, an axially aligned driven shaft, a parallel counter shaft, a constant mesh gear train between said drive shaft and counter shaft, a gear surrounding said driven shaft forming a member of a train connected thereto, a gear slidable upon and splined to said counter shaft shiftable into engagement with said last mentioned gear, an idler gear in constant mesh with said counter shaft gear and means for shifting said idler gear into mesh with the said gear surrounding said driven shaft while maintaining intermeshing engagement with said gear on the counter shaft.

3. In a transmission gearing, the combination of a drive shaft, an axially aligned driven shaft, a parallel counter shaft, a constant mesh gear train between said drive shaft and counter shaft, a shiftable gear on said counter shaft, a shiftable idler gear in constant mesh with said counter shaft gear and a single gear forming a member of a train connected to said driven shaft adapted to be alternatively engaged by said counter shaft gear and said idler gear.

4. In a transmission mechanism, the combination of a drive shaft, an axially aligned driven shaft having a journalled engagement with said drive shaft, a peripheral spline portion of said driven shaft adjacent said drive shaft, a member rotatively mounted on said driven shaft having a peripheral splined portion adjacent to the spline portion of said driven shaft, a reduction gear train between said rotative member and said driven shaft, a sleeve extending from said drive shaft to surround the spline portions of said driven shaft and rotatively mounted member, clutch rollers engaging longitudinal slots in said sleeve and surrounding respectively said spline portions, and a shiftable sleeve normally intermediate said clutch rollers adapted when moved in opposite directions to force said rolls into engagement with said splines to alternatively couple said drive shaft directly to said driven shaft or to said rotative member.

5. In a transmission gearing, the combination with a casing and a shaft journaled therein, of a spool member surrounding said shaft comprising abutting sections, an internal ring gear secured between said abutting sections, and journal bearings in said casing eccentric to the axis of said shaft for externally engaging said spool member on opposite sides of said ring gear.

6. In a transmission gearing, the combination with a casing and a shaft journaled therein, of a spool member surrounding said shaft comprising abutting flanged sections, an internal ring gear secured between the abutting flanges, an external gear on the periphery of one of said flanges and journal bearings in said casing eccentric to the axis of said shaft externally engaging said spool member on opposite sides of said abutting flanges.

7. In a transmission gearing, the combination with a casing and a shaft journaled therein, of a spool member surrounding said shaft comprising abutting flanged sections forming a recess, an internal ring gear engaging said recess and clamped between said flanged sections, an external gear wheel on the periphery of one of said flanges, journal bearings in said casing eccentric to the axis of said shaft and externally engaging said spool on opposite sides of said abutting flanges and an external ring gear detachably engaging one of said sections on the outer side of the journal bearing therefor.

8. In a transmisison gearing, the combination with a casing and a shaft journaled therein, of a gear member rotatively sleeved upon said shaft, a spool member surrounding said shaft comprising abutting flanged sections forming a recess, an internal ring gear engaging said recess and clamped between said abutting flanges, an external gear formed on the periphery of one of said flanges, journal bearings in said casing eccentric to said shaft engaging said spool member on opposite sides of said abutting flanges and holding said internal gear in mesh with the gear sleeved upon said shaft, an external gear detachably engaging one of said sections on the outer side of the journal bearing therefor, an internal gear wheel secured to said shaft and intermeshing with said external gear wheel and means for alternatively driving said shaft directly or through said gear train.

9. In a transmission gearing, the combination of a drive shaft, an externally aligned driven shaft, a parallel counter shaft, a constant mesh gear train between said drive shaft and said counter shaft, a gear rotatively sleeved on said driven shaft, means for alternatively clutching said drive shaft directly with said driven shaft or with said sleeve gear, a spool member surrounding said driven shaft and sleeve gear comprising abutting flanged sections, an internal ring gear engaging a recess in and secured between said abutting flanged sections, an external gear on the periphery of one of the abutting flanges, a casing in which said shafts are journaled, journal bearings in said casing eccentric to said driven shaft and externally engaging said spool on opposite sides of said abutting flanges to hold said internal ring gear in mesh with the gear sleeved on said driven shaft, an external gear of greater diameter than one of said journal bearings detachably mounted on said spool outside of said bearings, an internal gear wheel mounted on said driven shaft and in mesh with said last mentioned external gear, and a gear on said counter shaft shiftable to mesh with the external gear on said flange whereby three differential trains may be alternatively established between said drive shaft and driven shaft.

10. In a transmission mechanism, an internal gear spool comprising abutting flange sections, an internal ring gear clamped between the abutting flanges and an external ring gear mounted on one of said sections.

In testimony whereof I affix my signature.

WILLIAM A. McCARRELL.